(12) United States Patent
Kim et al.

(10) Patent No.: US 11,654,897 B2
(45) Date of Patent: May 23, 2023

(54) SYSTEM AND METHOD FOR CONTROLLING AUTONOMOUS PARKING OF VEHICLE

(71) Applicants: HYUNDAI MOTOR COMPANY, Seoul (KR); KIA CORPORATION, Seoul (KR); Hyundai Mobis Co., Ltd., Seoul (KR)

(72) Inventors: Jongmo Kim, Goyang-si (KR); Minsung Son, Gwacheon-si (KR); Hayeon Lee, Gwacheon-si (KR); Jinwook Choi, Seoul (KR); Wonjune Lee, Yongin-si (KR); Sohee You, Suwon-si (KR)

(73) Assignees: Hyundai Motor Company, Seoul (KR); Kia Motors Corporation, Seoul (KR); Hyundai Mobis Co., Ltd., Seoul (KR)

( * ) Notice: Subject to any disclaimer, the term of this patent is extended or adjusted under 35 U.S.C. 154(b) by 59 days.

(21) Appl. No.: 17/341,788

(22) Filed: Jun. 8, 2021

(65) Prior Publication Data
US 2022/0073055 A1    Mar. 10, 2022

(30) Foreign Application Priority Data
Sep. 7, 2020 (KR) .......................... 10-2020-0113689

(51) Int. Cl.
| | | |
|---|---|---|
| *B60W 30/06* | (2006.01) | |
| *G06V 10/30* | (2022.01) | |
| *G06V 10/44* | (2022.01) | |
| *G06V 20/58* | (2022.01) | |
| *G06V 20/56* | (2022.01) | |
| *G06F 18/23* | (2023.01) | |
| *G06F 18/2431* | (2023.01) | |

(52) U.S. Cl.
CPC ............ *B60W 30/06* (2013.01); *G06F 18/23* (2023.01); *G06F 18/2431* (2023.01); *G06V 10/30* (2022.01); *G06V 10/443* (2022.01); *G06V 20/586* (2022.01); *G06V 20/588* (2022.01)

(58) Field of Classification Search
CPC .... B60W 30/06; B60W 40/02; B60W 60/001; B60W 2050/0052; B60W 2050/0059; B60W 2420/42; B60W 2554/80; G06K 9/6218; G06K 9/628; G06V 10/30; G06V 10/443; G06V 20/586; G06V 20/588; G06V 10/762; B62D 15/0285; G08G 1/14; B60Y 2300/06
See application file for complete search history.

(56) References Cited

U.S. PATENT DOCUMENTS

2020/0079359 A1* 3/2020 Tsujino .................. B60W 50/14
2020/0184278 A1* 6/2020 Zadeh .................. G06K 9/6264

* cited by examiner

*Primary Examiner* — Daryl C Pope
(74) *Attorney, Agent, or Firm* — Morgan, Lewis & Bockius LLP

(57) ABSTRACT

A system for performing autonomous parking of a vehicle includes: a camera configured to acquire a surrounding image of the vehicle including a parking line; and a controller configured to derive spatial recognition data based on the surrounding vehicle image as an input, derive a feature point corresponding to the parking line based on the surrounding image and the spatial recognition data, determine a candidate parking line based on clustering of the feature point, and control the vehicle to perform parking in a parking area having the candidate parking line.

16 Claims, 8 Drawing Sheets

SYSTEM AND METHOD FOR CONTROLLING AUTONOMOUS PARKING OF VEHICLE

CROSS-REFERENCE TO RELATED APPLICATION(S)

The present application claims priority to Korean Patent Application No 10-2020-0113689, filed on Sep. 7, 2020 in the Korean Intellectual Property Office, the entire contents of which is incorporated herein for all purposes by this reference.

TECHNICAL FIELD

The present disclosure relates to a vehicle and a control method thereof performing an autonomous parking.

BACKGROUND

The autonomous driving technology is a technology for automatically driving a vehicle by grasping a condition of the road without a driver manually controlling a brake, a steering wheel, or an accelerator pedal.

The autonomous driving technology is a core technology for smart car implementation which includes technology such as Highway driving assistance system (HDA, technology that automatically maintains the distance between cars), Rear side alarm system (BSD, technology to detect nearby vehicles while reversing and sound an alarm), Automatic emergency braking system (AEB, a technology that activates the brake system when the vehicle ahead is not recognized), Lane departure warning system (LDWS), Lane keeping assistance system (LKAS, a technology that compensates for leaving the lane without turn signals), Advanced Smart Cruise Control (ASCC, technology that maintains the distance between cars at a set speed and travels at a constant speed), Congested Section Driving Assistance System (TJA), Parking Collision-Avoidance Assist (PCA), and an autonomous parking system (Remote Smart Parking Assist).

In the technology for recognizing surrounding objects and parking spaces for autonomous parking control of vehicles, parking was performed using ultrasonic signals.

In recent years, research on an autonomous parking system that performs parking by additionally utilizing a camera has been actively conducted.

SUMMARY

The present disclosure provides a vehicle and a controlling method thereof capable of performing an accurate autonomous parking operation by learning an image obtained by a camera and using the learned data.

In accordance with an aspect of the present disclosure, a vehicle performing autonomous parking, may include a camera configured to acquire a surrounding image of the vehicle including a parking line; and a controller configured to derive spatial recognition data based on the surrounding vehicle image as an input, derive a feature point corresponding to the parking line based on the surrounding image and the spatial recognition data, determine a candidate parking line based on clustering of the feature point, and control the vehicle to perform parking in a parking area having the candidate parking line.

The controller may be configured to remove noise of the surrounding image of the vehicle by using a predetermined first filter, and extract an edge based on a gradient of each pixel including in the surrounding image of the vehicle.

The controller may be configured to classify objects included in the surrounding image of the vehicle into at least one category based on the spatial recognition data.

The controller may be configured to derive a plurality of feature points corresponding to the parking line from the surrounding image of the vehicle and the spatial recognition data using a predetermined second filter corresponding to the area of the parking line.

The controller may be configured to determine reliability of each of the plurality of feature points based on consistency of the direction values of each of the plurality of feature points corresponding to the parking line, and determine the candidate parking line based on the feature point whose reliability exceeds a predetermined value.

The controller may be configured to determine the parking area based on the feature point corresponding to the parking line when the feature point corresponds to the parking line included in the vehicle corresponding to the surrounding image of the vehicle and the spatial recognition data.

The controller may be configured to determine the parking area based on the number of pixels corresponding to the parking line, the ratio of the number of pixels of the feature point and the feature point.

The controller may be configured to determine the candidate parking line based on a first feature point and a second feature point when an overlap ratio of the first feature point determined based on the surrounding image of the vehicle, and the second feature point determined based on the spatial recognition data exceeds a predetermined value.

The controller may be configured to determine a plurality of candidate parking lines, determine a first area provided as a boundary with the endpoint of the candidate parking line, determine a second area between the candidate parking lines and in which the candidate parking line is provided, and determine the parking area based on the ratio of the number of pixels in the first area and the number of pixels in the second area.

A controlling method of a vehicle performing autonomous parking includes acquiring a surrounding image of the vehicle including a parking line; deriving spatial recognition data based on the surrounding vehicle image as an input, deriving a feature point corresponding to the parking line based on the surrounding image and the spatial recognition data, determining a candidate parking line based on clustering of the feature point, and controlling the vehicle to perform parking in a parking area having the candidate parking line.

Determining the candidate parking line may include: removing noise of the surrounding image of the vehicle by using a predetermined first filter, and extracting an edge based on a gradient of each pixel including in the surrounding image of the vehicle.

Determining the candidate parking line may include classifying objects included in the surrounding image of the vehicle into at least one category based on the spatial recognition data.

Determining the candidate parking line may include deriving a plurality of feature points corresponding to the parking line from the surrounding image of the vehicle and the spatial recognition data using a predetermined second filter corresponding to the area of the parking line.

Determining the candidate parking line may include determining reliability of each of the plurality of feature points based on consistency of the direction values of each of the plurality of feature points corresponding to the parking line, and determining the candidate parking line based on the feature point whose reliability exceeds a predetermined value.

Determining the candidate parking line may include: determining the parking area based on the feature point corresponding to the parking line when the feature point corresponds to the parking line included in the vehicle corresponding to the surrounding image of the vehicle and the spatial recognition data.

Controlling the vehicle to perform parking in the parking area may include determining the parking area based on the number of pixels corresponding to the parking line, the ratio of the number of pixels of the feature point and the feature point.

Determining the candidate parking line may include: determining the candidate parking line based on a first feature point and a second feature point when an overlap ratio of the first feature point determined based on the surrounding image of the vehicle, and the second feature point determined based on the spatial recognition data exceeds a predetermined value.

Controlling the vehicle to perform parking in the parking area may include determining a plurality of candidate parking lines, determining a first area provided as a boundary with the endpoint of the candidate parking line, determining a second area between the candidate parking lines and in which the candidate parking line is provided, and determining the parking area based on the ratio of the number of pixels in the first area and the number of pixels in the second area.

DETAILED DESCRIPTION

In the following description, like reference numerals refer to like elements throughout the specification. This specification does not describe all elements of the embodiments, and in the Field of the Disclosure to which an exemplary embodiment of the present disclosure pertains, there is no overlap between the general contents or the embodiments. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it may be directly or indirectly connected to the other element, wherein the indirect connection includes "connection via a wireless communication network".

Further, when a part "includes" or "comprises" an element, unless there is a particular description contrary thereto, the part may further include other elements, not excluding the other elements.

In addition, when a part "includes" a certain component, it means that other components may be further included rather than excluding other components unless specifically stated to the contrary.

Throughout the specification, when a member is said to be positioned "on" another member, this includes not only the case where the member is in contact with the other member, but also the case where another member exists between the two members.

Terms such as first and second are used to distinguish one component from other components, and the component is not limited by the above-described terms.

Expressions in the singular number include expressions in the plural unless the context clearly has exceptions.

In each step, the identification code is used for convenience of explanation, and the identification code does not describe the order of each step, and each step may be performed differently from the specified order unless a specific sequence is clearly stated in the context.

Hereinafter, an operating principle and embodiments of the present disclosure will be described with reference to the accompanying drawings.

Figure 1:
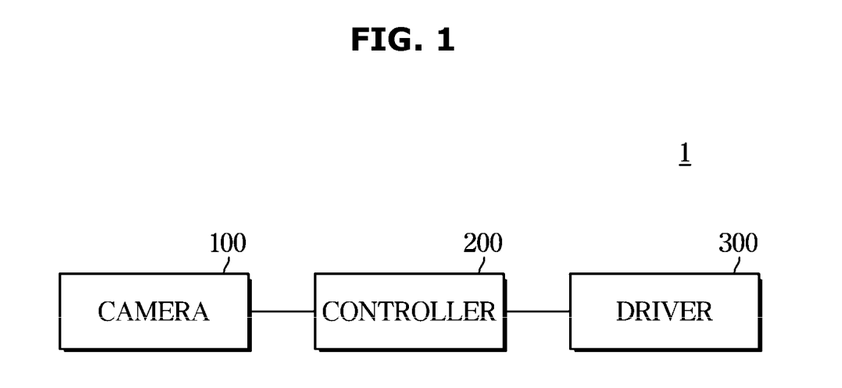
FIG. 1 is a control block diagram according to an exemplary embodiment of the present disclosure.

FIG. 1 is a control block diagram of a vehicle according to an exemplary embodiment of the present disclosure.

Referring to FIG. 1, a vehicle 1 according to an exemplary embodiment may include a camera 100, a controller 200, and a driver 300.

The vehicle 1 may be implemented to perform autonomous parking.

The camera 100 may have a plurality of channels and acquire an image around the vehicle.

The camera 100 according to an embodiment may be provided around a vehicle to perform an operation of a surround view monitor (SVM).

The camera 100 may include a charge-coupled device (CCD) camera or a CMOS color image sensor installed in the vehicle 1.

Here, both CCD and CMOS refer to sensors that convert light that has entered through the lens of the camera 100 into electrical signals and store them.

The camera 100 may acquire an image around the vehicle including the parking line.

The controller 200 may derive spatial recognition data by learning the surrounding images as input values.

Spatial recognition data may mean data derived by performing deep learning using a surrounding image as input data.

Specifically, the spatial recognition data may refer to a deep learning-based spatial recognition result for each of the 4 channel camera images or a spatial recognition result in the form of a surrounding view generated therefrom.

The spatial recognition function may mean deep learning-based algorithm that classifies various objects, including floors (roads), parking lines, vehicles, pillars, and obstacles observed on an image, into image pixels, or the operation of classifying objects included in the surrounding image based on light reflection or shadow.

The driver 300 may be provided as a device capable of driving a vehicle.

According to an embodiment, the driver 300 may include an engine and may include various components for driving the engine.

Specifically, the driver 300 may include a brake and a steering device, and if it is a configuration that implements driving of a vehicle, there is no limitation on the device configuration.

The controller 200 may perform an object recognition operation such as an empty space, a parking line, a pillar, or a vehicle based on the space recognition data.

The controller 200 may derive a feature point corresponding to the parking line based on the surrounding image and space recognition data.

The feature point may mean a pixel constituting the parking line.

The controller 200 can cluster feature points. In clustering, information about the gradient and direction of each feature point can be used. A detailed description of this will be described later.

In addition, the controller 200 may determine a candidate parking line based on clustering of feature points.

The candidate parking line may mean a parking line that is a basis for performing autonomous parking by a controller using a feature point, not an image included in the image.

The controller 200 may control the vehicle to perform parking in a parking area composed of candidate parking lines. In the present disclosure, the controller 200 may be a computer, a processor (CPU) or an electronic control unit (ECU) which is programmable to control various electronic systems in the vehicle.

The controller 200 may remove noise from the image around the vehicle by using a predetermined first filter.

According to an embodiment, the first filter may mean a Gaussian filter. Meanwhile, the controller may extract an edge based on a gradient of each pixel included in an image around the vehicle.

The gradient may mean a gradient relationship between the pixels included in the image.

When the size of the gradient exceeds a specific value, the controller 200 may determine the corresponding portion as an edge.

The controller 200 may classify objects included in the image around the vehicle into at least one category based on spatial recognition data.

Specifically, considering the processing efficiency within the algorithm, the controller 200 can simplify the classification of objects included in the image around the vehicle into eight or more classes (e.g., three classes such as space, parking line, etc.).

The controller 200 may additionally perform an image interpolation when generating in a surrounding view form using a spatial recognition result of a 4-channel camera.

The controller 200 may derive a plurality of feature points corresponding to the parking line from the image around the vehicle and the space recognition data using a second predetermined filter corresponding to the area of the parking line.

The second filter according to an embodiment may mean a top-hat filter. The top-hat filter may mean an actual spatial or Fourier spatial filtering technique.

The top-hat filter outputs a large value on a line having a width proportional to the filter size, and shows a low output in other areas.

Accordingly, the controller 200 may perform top-hat filtering having a size similar to the width of the parking line to determine an area with a line component similar to the width of the parking line.

The controller 200 may determine a maximum value on the output of the top-hat filter and determine the maximum value as a feature point of the parking line.

In order to determine the direction (angle) of the line from the feature points of each line, the controller 200 may determine an orientation based on the gradient of each feature point.

The controller 200 can extract line component feature points similar to the width of the parking line through top-hat filtering on the spatial recognition result data.

The controller 200 determines the reliability of each of the plurality of feature points based on the consistency of direction values of each of the plurality of feature points corresponding to the parking line, and determines the candidate parking line based on the feature point whose reliability exceeds a predetermined value.

Specifically, the controller 200 may perform top-hat filtering in a predefined direction from the original camera image or the surrounding view image, extract line feature points from an area with a line component having a certain width, and measure the reliability of each feature point.

The reliability value of the controller 200 may be determined based on coherence between the output of the top-hat filter at the location of the corresponding feature point and the direction of the feature point.

The direction consistency value may indicate how consistent the directionality of the gradient is within an area of a certain radius around the position of the feature point.

The controller 200 may determine that a feature point extracted on a line has a high directional consistency value, and a feature point erroneously extracted from a position other than a line has a low consistency value.

The controller 200 can extract line component feature points by similar top-hat filtering on the spatial recognition result or the surrounding view type result based on the spatial recognition result.

The controller 200 may determine the reliability of each feature point based on this operation. In this case, the reliability of each feature point may be obtained by obtaining an average of the reliability in a region within a certain radius around the location of the corresponding feature point.

The controller 200 may determine reliability for line feature points determined by the above-described operation.

The controller 200 may determine a candidate parking line by determining that only the feature points having a certain threshold or higher have been extracted from the line by using the feature points whose reliability exceeds a predetermined value, and determine the remaining feature points as noise and remove them.

The sum of the reliability can be determined by the following equation.

$$S_{total} = w1 \cdot S_{org} + w2 \cdot S_{sd} \qquad \text{[Equation 1]}$$

Referring to Equation 1, Stotal denotes reliability, and w1 and w2 denote a weight corresponding to each of the surrounding image and spatial recognition data.

In addition, Sorg may mean a reliability determined based on an image, and Ssd may mean a reliability determined based on spatial recognition data.

When the feature point corresponds to the parking line included in the vehicle surrounding image and the space recognition data, the controller 200 may determine the parking area based on the feature point corresponding to the parking line.

The parking area may mean an area in which the vehicle parks the vehicle through autonomous parking.

The controller 200 may determine a parking area based on a ratio of the number of pixels corresponding to the parking line and the number of pixels of the feature point and the feature point.

The operation of the controller 200 to determine the ratio between the number of pixels corresponding to the parking line and the number of pixels of the feature point will be described in detail below.

When the overlap ratio of the first feature point determined based on the vehicle surrounding image and the second feature point determined based on spatial recognition data exceeds a predetermined value, the controller 200 may determine the candidate parking line based on the first feature point and the second feature point.

The controller 200 may determine a plurality of candidate parking lines based on the above-described operation. The controller 200 may determine a first area provided as a boundary around the end point of the candidate parking line.

That is, the first area may mean a boundary point of a candidate parking line derived by the controller.

The controller 200 may determine a second area between the candidate parking lines and in which the candidate parking lines are provided, and may determine the parking area based on a ratio of the number of pixels corresponding to the first area and the number of pixels in the second area. A description related to this will be described later.

The controller 200 may be implemented by a memory (not shown) that stores data on an algorithm for controlling the operation of components in the vehicle or a program that reproduces the algorithm, and a processor (not shown) that performs the above-described operation using data stored in the memory.

In this case, the memory and the processor may be implemented as separate chips, respectively. Alternatively, the memory and the processor may be implemented as a single chip.

At least one component may be added or deleted corresponding to the performance of the components of the vehicle shown in FIG. 1. In addition, it will be readily understood by those of ordinary skill in the art that the mutual positions of the components may be changed corresponding to the performance or structure of the system.

Each component shown in FIG. 1 refers to software and/or hardware components such as a Field Programmable Gate Array (FPGA) and an Application Specific Integrated Circuit (ASIC).

Figure 2:
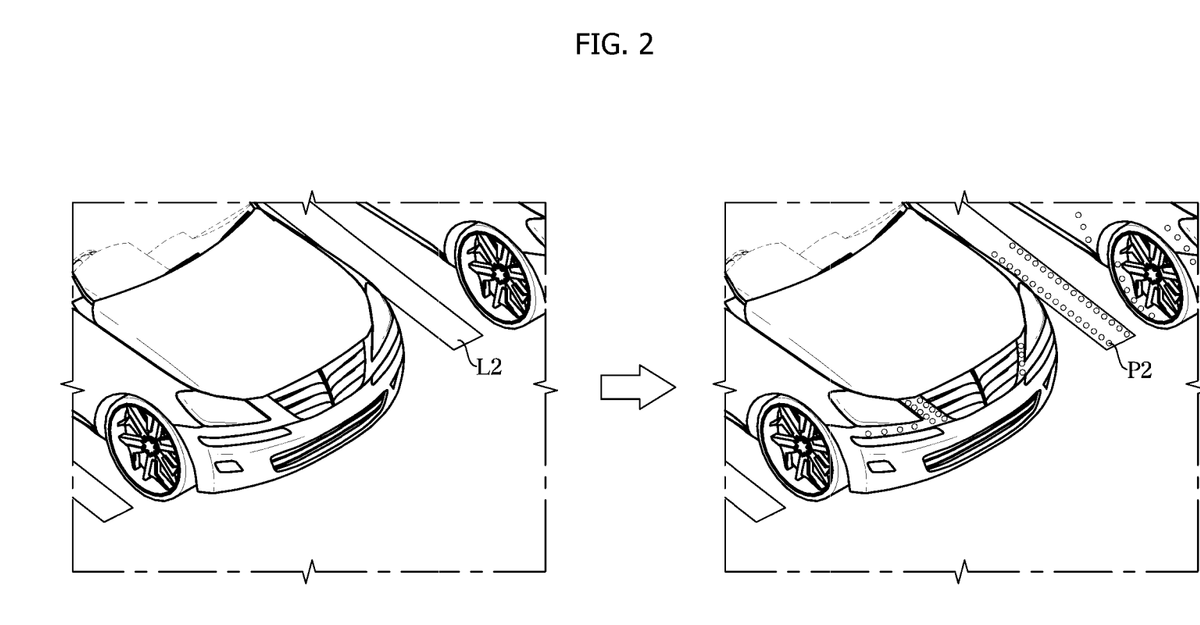
FIG. 2 is a diagram for describing an operation of deriving feature points corresponding to parking lines according to an exemplary embodiment of the present disclosure.

FIG. 2 is a diagram for describing an operation of deriving feature points corresponding to parking lines according to an exemplary embodiment.

Referring to FIG. 2, FIG. 2 shows an operation of determining a feature point P2 based on an image acquired by a vehicle.

Before deriving the feature point P2, the controller may perform filtering to remove noise from the input camera original image or surrounding view data, and perform a task for extracting edge data.

The control unit may perform a class simplification task for efficient algorithm processing on spatial recognition data classified as objects.

Referring to FIG. 2, the controller may perform 1D top-hat filtering in a predefined direction (vertical, horizontal direction, etc.) from the original camera image or the surrounding view image.

Specifically, the top-hat filter may output a large value in a line having a width proportional to a corresponding filter size, and may output a low value in other areas.

The control unit may perform top-hat filtering having a size similar to the width of the parking line L2 to find an area having a line component similar to the width of the parking line.

In addition, the controller may determine the maximum value on the output of the top-hat filter as the feature point P2 of the line. In order to estimate the direction (angle) of the line at each line feature point P2, a gradient-based direction may be determined.

The controller may perform similar operations on spatial recognition data.

That is, the controller may derive a plurality of feature points corresponding to the parking line from the vehicle surrounding image and space recognition data using a top-hat filter corresponding to the area of the parking line L2.

Figure 3:
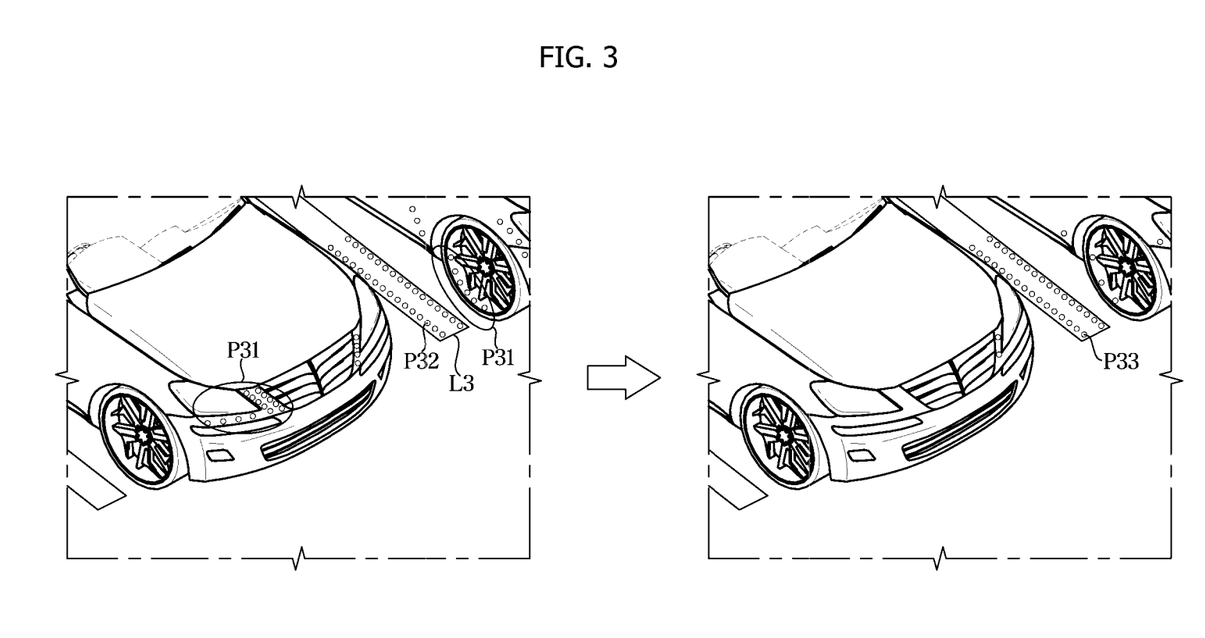
FIG. 3 is a diagram for describing an operation of removing erroneously detected feature points according to an exemplary embodiment of the present disclosure.

FIG. 3 is a diagram for describing an operation of removing erroneously detected feature points according to an exemplary embodiment.

Referring to FIG. 3, the controller may project the feature points P31 and P32 onto the domain of the spatial recognition result data.

The controller may correspond the feature points P31 and P32 to the parking line P3 included in the vehicle surrounding image and the spatial recognition data.

Among these feature points, the feature points P31 located on objects (vehicles, pillars, obstacles, etc.) other than the parking line are considered to be feature points that are not necessary to determine a candidate parking line, the controller may consider the corresponding feature point P31 as a falsely detected feature point and remove it.

The controller may remove the feature point P31 that does not correspond to the parking line among the feature points through the above-described method and determine the candidate parking line P33 based on the feature point P32 corresponding to the parking line.

Figure 4:
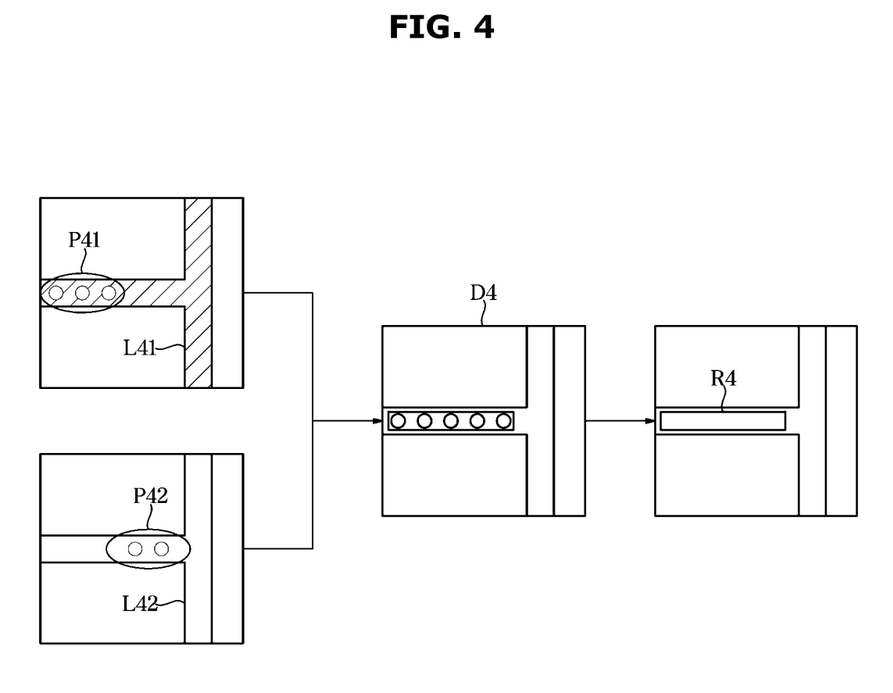
FIG. 4 is a diagram for describing an operation of determining a candidate parking line based on a ratio of the number of pixels corresponding to the parking line and the number of pixels of the feature point according to an exemplary embodiment of the present disclosure.

FIG. 4 is a diagram for describing an operation of determining a candidate parking line R4 based on a ratio of the number of pixels corresponding to the parking lines L41 and L42 and the number of pixels of the feature point according to an exemplary embodiment.

The controller may determine a ratio between the number of pixels corresponding to the parking line and the number of pixels of the feature point.

The controller may determine a parking area composed of candidate parking lines based on these ratios and feature points.

The controller may project the line feature points P41 and P42 secured from the surrounding image and spatial recognition data onto the same domain D4, that is, the parking lines L41 and L42 to correspond to each other.

The controller may perform clustering between feature points that are adjacent to each other and have a similar direction with respect to the line feature points, and generate a candidate parking line R4.

Generating the candidate parking line R4 by the controller may include determining information such as width, length, direction, and positions of both end points of each candidate parking line candidate.

In order to verify whether the extracted candidate parking line R4 is erroneously detected, the controller estimates the area where each candidate parking line is located using information on both ends and widths of the candidate parking line and calculates the ratio of pixels based on the spatial recognition result within the corresponding candidate parking line area.

Specifically, the controller may derive the feature point P41 from the parking line L41 included in the surrounding image.

In addition, the controller may derive the feature point P42 from the parking line L42 provided on the spatial recognition data.

The controller may associate these feature points P41 and P42 with the parking lines L41 and L42. That is, the controller can project each feature point P41 and P42 onto the domain D4.

The controller may determine a ratio of a pixel of a feature point of each projected parking line to a pixel of a corresponding parking line area. This ratio may be determined based on Equation 2 below.

$$S_p = \frac{F_P}{L_P} \qquad \text{[Equation 2]}$$

Referring to Equation 2, FP may denote the number of pixels of feature points corresponding to the parking line, and LP may denote the number of pixels in the parking line area. SP may mean a ratio between the number of pixels of the feature point corresponding to the parking line and the number of pixels in the parking line area.

If the calculated ratio SP is greater than or equal to a predetermined value, the controller may determine that the corresponding feature point is a parking line.

On the other hand, when the ratio is less than or equal to a predetermined value, the controller may determine and remove the corresponding feature point as a parking line in which a false detection was made.

That is, the controller may derive a feature point determined based on the surrounding image and a feature point determined based on the spatial recognition data.

In addition, the derived feature points P41 and P42 can be projected onto the parking line, that is, the domain.

When a ratio of the number of pixels constituting the parking line and the number of pixels of each feature point P41, P42 is determined, and the ratio exceeds a predetermined value, the controller may determine that the corresponding feature point constitutes the parking line and determine the corresponding feature points P41 and P42 as the candidate parking line R4.

FIG. 4 is only an operation of determining a candidate parking line according to an embodiment of the present disclosure, and there is no limitation on the operation of determining the candidate parking line.

Figure 5:
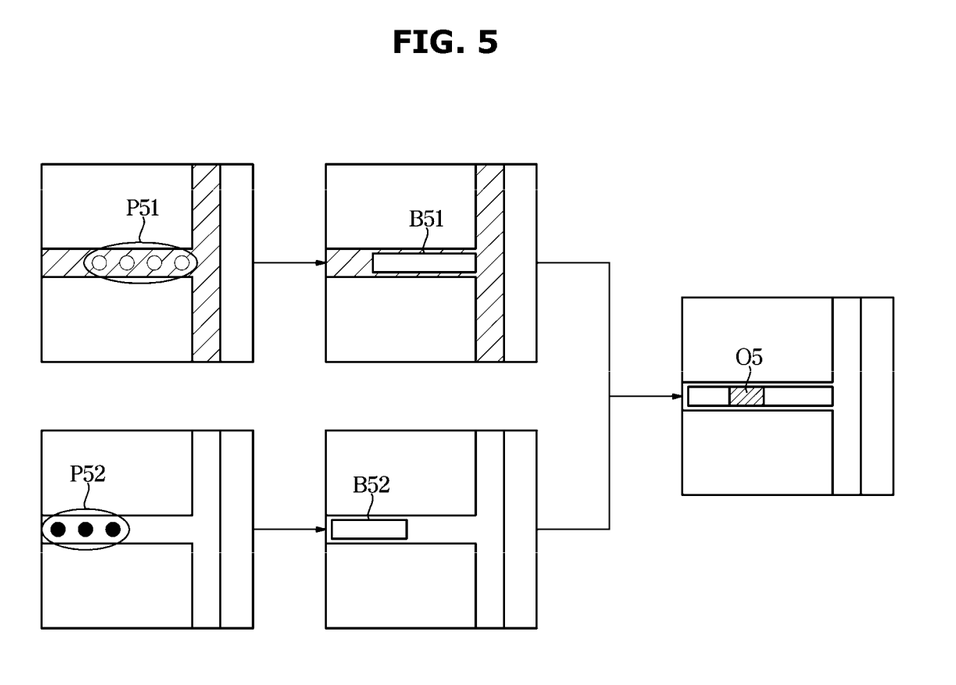
FIG. 5 is a diagram for explaining an overlap operation of a feature point determined based on a surrounding image and a feature point determined based on spatial recognition data, according to an exemplary embodiment of the present disclosure.

FIG. 5 is a diagram for explaining an overlapping operation of a feature point P51 determined based on a surrounding image and a feature point P52 determined based on spatial recognition data, according to an exemplary embodiment.

Referring to FIG. 5, when the overlap ratio of the first feature point P51 determined based on the image around the vehicle and the second feature point P52 determined based on the spatial recognition data exceeds a predetermined value, the controller may determine the candidate parking line based on the first feature point P51 and the second feature point P52.

For the first feature points extracted from the surrounding area, the controller may determine the boundary of the parking line in the neighborhood of each feature point.

The controller can determine the point where the size of the edge component is largest in the vicinity of each feature point as the parking line boundary point.

The controller may estimate the bounding box (B51, B52) by using the location information of each feature point and the parking line boundary point.

Likewise in spatial recognition data, the controller may search for pixels within a predetermined radius adjacent to the extracted second feature point, and cluster the corresponding pixels to estimate the parking line area.

The controller may determine a candidate parking line by comparing information such as location (area) and direction with each other with feature points extracted from the surrounding image and spatial recognition data, and fusing the matching lines.

Based on the information B51 that estimates the parking line area based on the first feature point acquired from the surrounding image and the second feature point acquired from the spatial recognition data, the controller may determine an overlapping area of the information B52 estimated for the parking line area.

That is, the overlap area O5 of the first feature point and the second feature point may be determined.

When the corresponding overlap area O5 exceeds a predetermined value, the controller may determine that the corresponding first feature point P51 and the second feature point P52 form a candidate parking line.

However, if the overlap area O5 is less than a predetermined value, the controller may determine the corresponding feature point as noise and remove it.

When the difference between the directions of the first feature point P51 and the second feature point P52 is less than a predetermined value and the overlap area O5 exceeds a predetermined value, the controller may determine an area formed by the corresponding feature point as a candidate parking line.

Figure 6A:
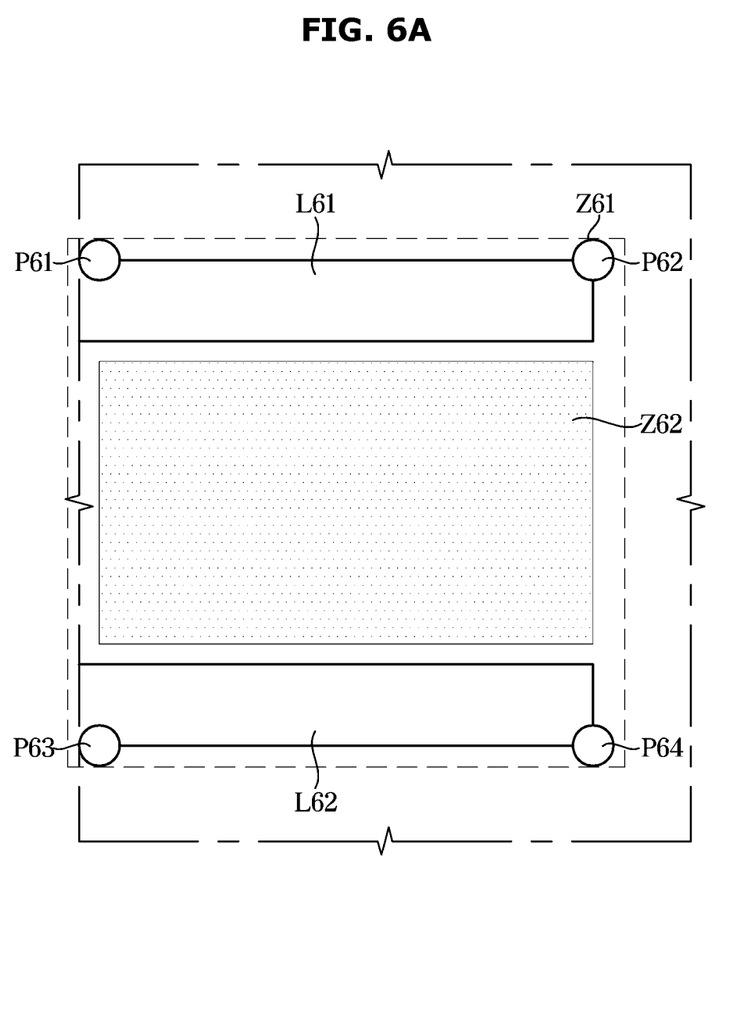
FIGS. 6A and 6B are views for explaining an operation of determining a parking area and performing autonomous parking in the corresponding parking area according to an exemplary embodiment of the present disclosure.
Figure 6B:
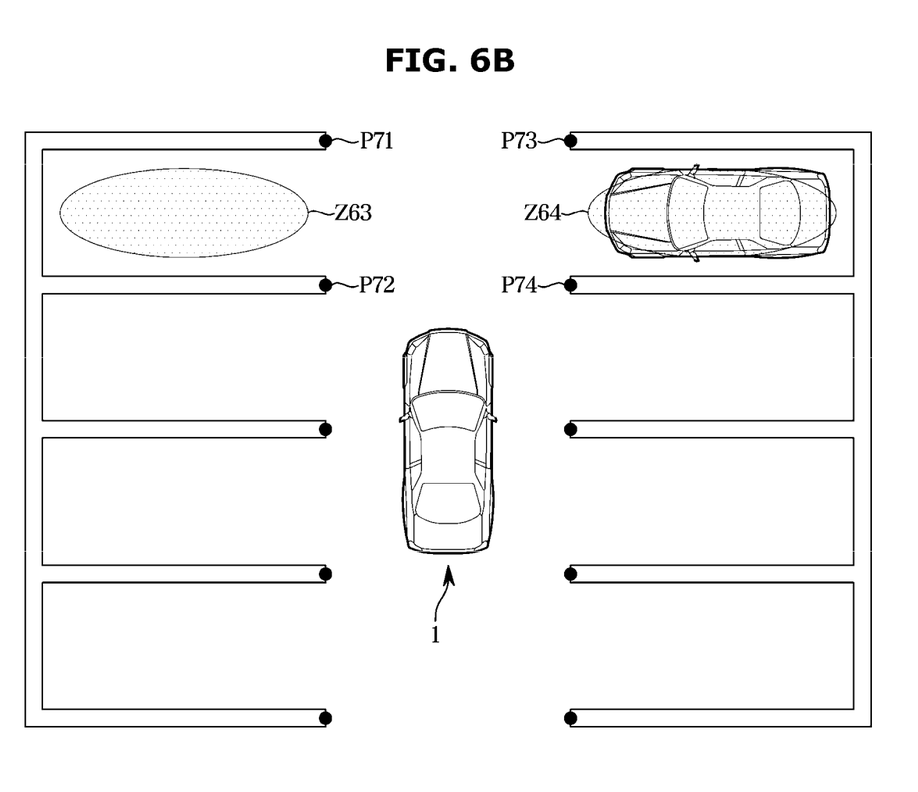

FIGS. 6A and 6B are views for explaining an operation of determining a parking area and performing autonomous parking in the corresponding parking area according to an exemplary embodiment.

Referring to FIG. 6A, the controller may determine a plurality of the candidate parking lines L61 and L62, a first area Z61 provided as a boundary with the end points P61, P62, P63, and P64 of the parking lines, a second area Z62 between the candidate parking lines and in which the candidate parking lines, and the parking area based on a ratio of the number of pixels corresponding to the first area Z61 and the number of pixels in the second area Z62.

The controller may determine a parking division candidate by pairing candidate parking lines determined based on the feature points.

In more detail, the parking division candidate may mean the second area Z62 between candidate parking lines.

The controller may determine the second area Z62 by using the position of the end point of each candidate parking line. That is, the controller may determine a parking area including a parking line as a boundary of each parking line, and determine an area between candidate parking lines as the second area Z62.

Referring to FIG. 6B, the controller may determine a found parking division candidate, that is, an empty parking area Z63 among the second areas Z63 and Z64, using spatial recognition data.

The controller may determine an empty parking area based on the following equation.

$$P_E = 1 - \frac{P_s + P_L}{P_{TOT}} \quad \text{[Equation 3]}$$

Referring to Equation 3, PE may denote the probability of an empty space, and PS may denote the number of pixels in the space. PL may mean the number of pixels in the parking line.

PTOT may mean the total number of pixels in the parking division area.

Specifically, the controller calculates a probability (PE) that a vehicle, an obstacle, or a person exists in the parking division area based on the space recognition result, and determines that the parking space is empty if the probability is less than a predetermined value.

In addition, when the corresponding area is determined to be an empty parking space, the controller may control the driving unit to control the vehicle to be parked in the corresponding area Z63.

The operations described in FIGS. 6A and 6B are only an embodiment of the present disclosure, and there is no limitation on the operation of determining an empty space in the vehicle and parking.

Figure 7:
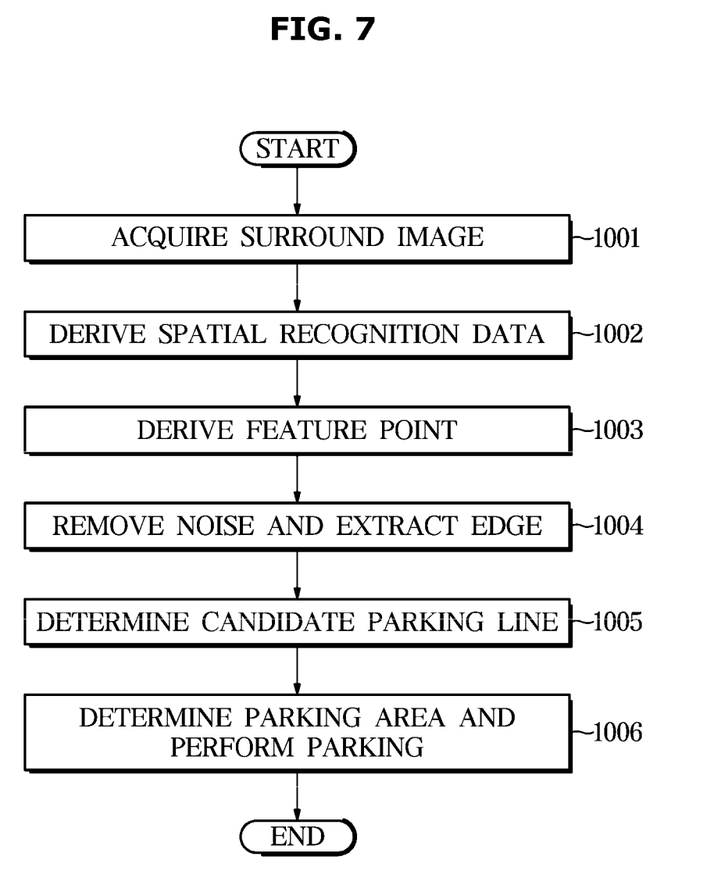
FIG. 7 is a flowchart describing a method for performing an autonomous parking according to an exemplary embodiment of the present disclosure.

FIG. 7 is a flowchart describing a method for performing an autonomous parking according to an embodiment of the present disclosure.

Referring to FIG. 7, the vehicle may acquire a surrounding image based on the camera (1001). The vehicle may derive spatial recognition data through deep learning based on the acquired surrounding images (1002).

The vehicle may derive feature points from surrounding images and spatial recognition data based on the above-described operation (1003).

The controller may perform preprocessing of removing noise and extracting an edge (1004).

The vehicle may determine a candidate parking line based on the preprocessed feature points (1005).

In addition, a parking area can be determined and parked based on the derived candidate parking line (1006).

On the other hand, the disclosed exemplary embodiments may be implemented in a form of a recording medium for storing instructions executable by a computer. Instructions may be stored in a form of program code and, when executed by a processor, may generate a program module to perform the operations of the disclosed exemplary embodiments. The recording medium may be implemented as a computer-readable recording medium.

The computer-readable recording medium includes all kinds of recording media in which instructions which may be decoded by a computer. For example, there may be read only memory (ROM), random access memory (RAM), a magnetic tape, a magnetic disk, a flash memory, an optical data storage device, and the like.

As described above, the disclosed exemplary embodiments have been described with reference to the accompanying drawings. Although example embodiments of the present disclosure have been shown and described, it would be appreciated by those skilled in the art that changes may be made to these embodiments without departing from the principles and spirit of the present disclosure, the scope of which is defined in the claims and their equivalents.

The vehicle and the controlling method according to an exemplary embodiment may learn an image obtained by a camera and perform an accurate autonomous parking operation using the learned data.

What is claimed is:

1. A system for performing autonomous parking of a vehicle,
the system comprising:
a camera configured to acquire a surrounding image of the vehicle including a parking line; and
a controller configured to:
derive spatial recognition data based on the surrounding image as an input,
derive a feature point corresponding to the parking line based on the surrounding image and the spatial recognition data,
determine a candidate parking line based on clustering of the feature point, and
control the vehicle to perform parking in a parking area which has the candidate parking line,
wherein the controller is configured to determine a plurality of additional candidate parking lines, determine a first area provided as a boundary with endpoints of the plurality of additional candidate parking lines and an endpoint of the candidate parking line, determine a second area provided as an empty space between the plurality of additional candidate parking lines and the candidate parking line, and determine the parking area based on a ratio of a number of pixels in the first area and a number of pixels in the second area.

2. The vehicle according to claim 1, wherein the controller is configured to remove noise of the surrounding image of the vehicle by using a first filter, and extract an edge based on a gradient of each pixel including in the surrounding image of the vehicle.

3. The vehicle according to claim 1, wherein the controller is configured to classify objects included in the surrounding image of the vehicle into at least one category based on the spatial recognition data.

4. The vehicle according to claim 1, wherein the controller is configured to derive a plurality of feature points corresponding to the parking line from the surrounding image of the vehicle and the spatial recognition data using a second filter corresponding to the parking area of the parking line.

5. The vehicle according to claim 4, wherein the controller is configured to determine reliability of each of the plurality of feature points based on consistency of direction values of each of the plurality of feature points corresponding to the parking line, and determine the candidate parking line based on a feature point of which reliability exceeds a predetermined value.

6. The vehicle according to claim 1, wherein the controller is configured to determine the parking area based on the feature point corresponding to the parking line when the feature point corresponds to the parking line included in the vehicle corresponding to the surrounding image of the vehicle and the spatial recognition data.

7. The vehicle according to claim 1, wherein the controller is configured to determine the parking area based on a number of pixels corresponding to the parking line, a ratio of a number of pixels of the feature point and the feature point.

8. The vehicle according to claim 1, wherein, when an overlap ratio of a first feature point determined based on the surrounding image of the vehicle and a second feature point determined based on the spatial recognition data exceeds a predetermined value, the controller is configured to determine the candidate parking line based on the first feature point and the second feature point.

9. A method for controlling autonomous parking of a vehicle, comprising:

acquiring a surrounding image of the vehicle including a parking line;

deriving spatial recognition data based on the surrounding vehicle image as an input;

deriving a feature point corresponding to the parking line based on the surrounding image and the spatial recognition data;

determining a candidate parking line based on clustering of the feature point; and controlling the vehicle to perform parking in a parking area having the candidate parking line, the controlling the vehicle to perform parking in the parking area includes:

determining a plurality of additional candidate parking lines;

determining a first area provided as a boundary with endpoints of the plurality of additional candidate parking lines and an endpoint of the candidate parking line;

determining a second area provided as an empty space between the plurality of additional candidate parking lines and the candidate parking line; and determining the parking area based on a ratio of a number of pixels in the first area and a number of pixels in the second area.

10. The method according to claim 9, wherein determining the candidate parking line includes:

removing noise of the surrounding image of the vehicle by using a first filter, and extracting an edge based on a gradient of each pixel including in the surrounding image of the vehicle.

11. The method according to claim 9, wherein determining the candidate parking line includes:

classifying objects included in the surrounding image of the vehicle into at least one category based on the spatial recognition data.

12. The method according to claim 9, wherein the determining the candidate parking line includes deriving a plurality of feature points corresponding to the parking line from the surrounding image of the vehicle and the spatial recognition data using a second filter corresponding to the parking area of the parking line.

13. The method according to claim 12, wherein the determining the candidate parking line includes:

determining reliability of each of the plurality of feature points based on consistency of direction values of each of the plurality of feature points corresponding to the parking line; and determining the candidate parking line based on the feature point having reliability that exceeds a predetermined value.

14. The method according to claim 9, wherein the determining the candidate parking line includes, when the feature point corresponds to the parking line included in the vehicle corresponding to the surrounding image of the vehicle and the spatial recognition data, determining the parking area based on the feature point corresponding to the parking line.

15. The method according to claim 9, wherein the controlling the vehicle to perform parking in the parking area includes determining the parking area based on the number of pixels corresponding to the parking line, a ratio of a number of pixels of the feature point and the feature point.

16. The method according to claim 9, wherein the determining the candidate parking line includes, when an overlap ratio of a first feature point determined based on the surrounding image of the vehicle, and a second feature point determined based on the spatial recognition data exceeds a predetermined value, determining the candidate parking line based on the first feature point and the second feature point.

\* \* \* \* \*